United States Patent
Joshi

(10) Patent No.: US 10,257,050 B2
(45) Date of Patent: Apr. 9, 2019

(54) DATA CENTER CABLE IDENTIFICATION

(71) Applicant: Prabodh Joshi, Windsor, CO (US)

(72) Inventor: Prabodh Joshi, Windsor, CO (US)

(73) Assignee: CA, Inc., New York, NY (US)

( * ) Notice: Subject to any disclaimer, the term of this patent is extended or adjusted under 35 U.S.C. 154(b) by 746 days.

(21) Appl. No.: 14/839,039

(22) Filed: Aug. 28, 2015

(65) Prior Publication Data

US 2017/0063638 A1   Mar. 2, 2017

(51) Int. Cl.
*H04L 12/24* (2006.01)

(52) U.S. Cl.
CPC .............. *H04L 41/22* (2013.01); *H04L 41/24* (2013.01)

(58) Field of Classification Search
CPC ..... H04L 41/22; H04L 41/24; H04L 67/1097; H04L 41/12; H04Q 1/136
See application file for complete search history.

(56) References Cited

U.S. PATENT DOCUMENTS

| | | | | |
|---|---|---|---|---|
| 9,537,535 B2* | 1/2017 | Lortz | ................... | H04B 5/0031 |
| 2004/0227621 A1* | 11/2004 | Cope | ..................... | G02B 6/483 |
| | | | | 370/487 |
| 2008/0115957 A1* | 5/2008 | Duffy | ...................... | H01B 7/32 |
| | | | | 174/112 |
| 2012/0139554 A1* | 6/2012 | Parsons | .................. | G01R 35/04 |
| | | | | 324/543 |
| 2013/0021597 A1* | 1/2013 | Carlson, Jr. | ......... | H04L 67/1097 |
| | | | | 356/73.1 |
| 2013/0044767 A1* | 2/2013 | Seelman | ............. | H04L 12/2807 |
| | | | | 370/474 |
| 2013/0138839 A1* | 5/2013 | Abuelsaad | ............. | H01R 24/64 |
| | | | | 710/16 |
| 2014/0173156 A1* | 6/2014 | Alshinnawi | ............. | G06F 13/36 |
| | | | | 710/305 |
| 2015/0316973 A1* | 11/2015 | Cudak | ..................... | G06F 1/329 |
| | | | | 713/320 |
| 2015/0318917 A1* | 11/2015 | Aguren | .................. | G06Q 10/06 |
| | | | | 398/25 |
| 2017/0111248 A1* | 4/2017 | German | ............. | H04L 43/0811 |

* cited by examiner

*Primary Examiner* — Afsar M Qureshi
(74) *Attorney, Agent, or Firm* — Baker Botts L.L.P.

(57) ABSTRACT

A communication link includes a first conductor configured to transmit data between a plurality of connected network devices. The communication link further includes an identification device configured to transmit an output that identifies the communication link when power is supplied to it and a second conductor configured to complete an electrical circuit when it receives the power from a particular device in the plurality of connected network devices. The identification device is coupled with the electrical circuit by a switch. The communication link also includes a logic module configured to receive an identification instruction in the data transmitted between the plurality of connected network devices. The logic module is also configured to, in response to receiving the identification instruction, actuate the switch to supply the identification device with power and transmit the output at the identification device.

20 Claims, 3 Drawing Sheets

DATA CENTER CABLE IDENTIFICATION

BACKGROUND

The disclosure relates generally to cable identification, and specifically data center cable identification.

SUMMARY

According to one embodiment of the disclosure, a communication link includes a first conductor configured to transmit data between a plurality of connected network devices. The communication link further includes an identification device configured to transmit an output that identifies the communication link when power is supplied to it and a second conductor configured to complete an electrical circuit when it receives the power from a particular device in the plurality of connected network devices. The identification device is coupled with the electrical circuit by a switch. The communication link also includes a logic module configured to receive an identification instruction in the data transmitted between the plurality of connected network devices. The logic module is also configured to, in response to receiving the identification instruction, actuate the switch to supply the identification device with power and transmit the output at the identification device.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
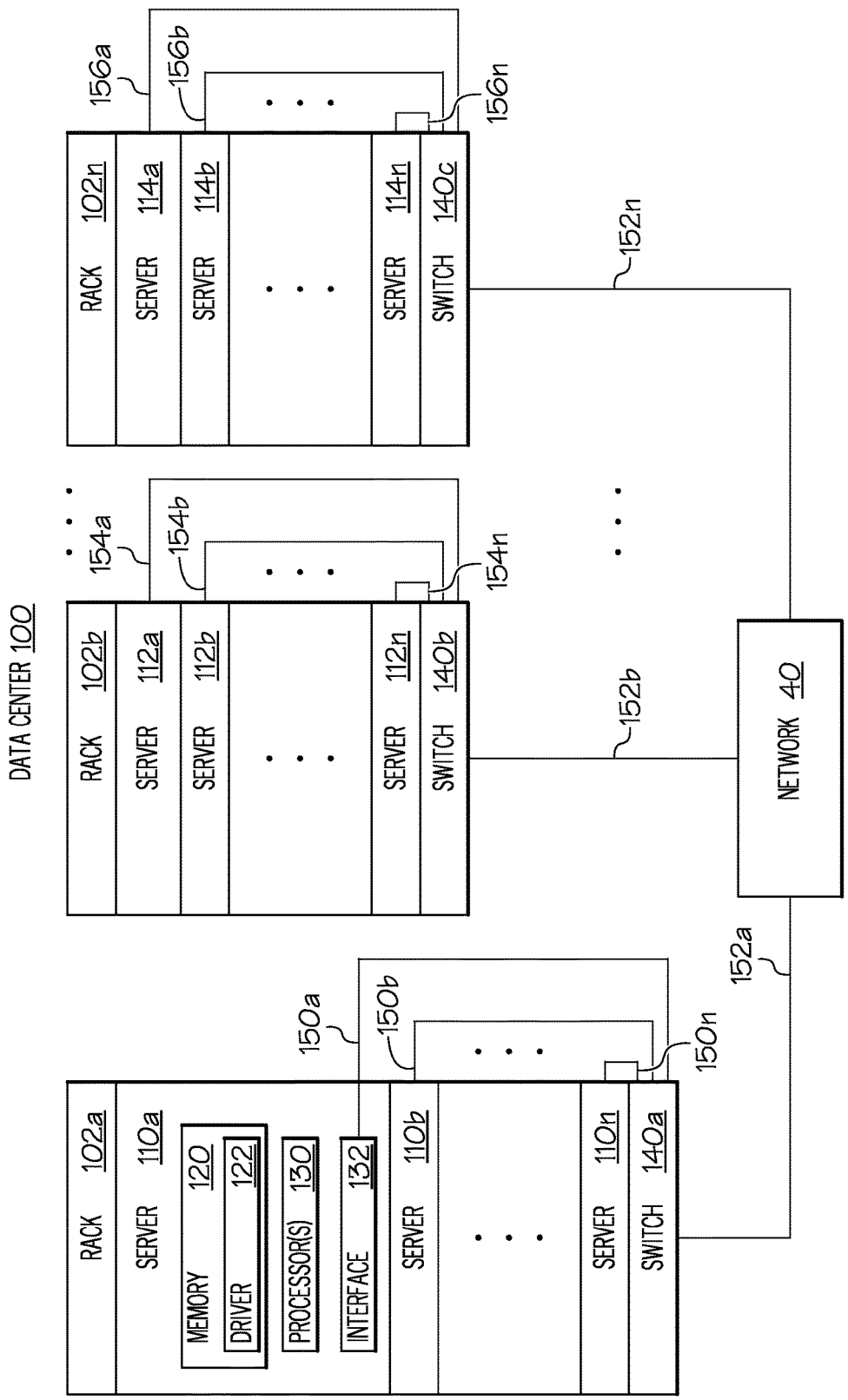
FIG. 1 illustrates a block diagram of a system for data center cable identification in accordance with a particular non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Organizations rely on information systems to run their business. If these systems become unavailable, unresponsive, or slow, business operations may suffer, causing the company to waste resources or lose money. Maintenance on these systems is critical to preventing operational inefficiencies and down-time. When errors do occur, prompt response by service personnel can mitigate the damage to the organization caused by any system down-time.

Modern data centers often include tens or hundreds of server racks, each holding numerous servers, network components, and ventilation and power equipment. For example, a 48U server rack can theoretically hold up to 48 1U servers, given the necessary power and cooling capacity. Each server requires at least several physical wires to connect to power supplies, network, and other interface components. Further, each server rack generally contains a network device, generally a switch, that connects each server to local area network. Each server requires a physical connection to the switch. Thus, even in the most basic data centers with only several server racks at less than maximum capacity, the data center may contain thousands of wires. In a complex data center, the sheer number of cables may be unmanageable using existing cable technology.

Certain server racks include wire management systems. For example, special compartments may keep wires tucked in to prevent accidental removal. These systems work to some extent to keep the data center organized, but do not assist in cable identification during emergency operations or data center maintenance operations. Further, these systems can frustrate emergency service operations by increasing the time required to identify cables hidden in the cable management compartments.

Additional existing systems may include battery operated push-button light emitting diodes ("LED") positioned at each end of a cable. However, an operator is required to physical depress a button in order to activate the identification device. Thus, the time required to identify the cable is not drastically reduced because the operator still has to locate the wire to depress the button. Further, problematic ports in the server room are not identified using this technique because the user must first locate the port in question in order to depress the button to activate the identification mechanism.

Accordingly, a need exists for a cable identification process that enables data center maintenance and emergency operations personnel to quickly and efficiently identify complex wiring configurations, problematic network components, and network connections. The teachings of the present disclosure present a solution to these and other issues.

The examples described in the present disclosure may have a user interface implemented as a device driver, command line program, or other application. The interface receives a user input and identifies the desired cable by producing an identification output, such as a light at each end of the cable. For example, a cable may have notification devices at each jack. The jacks may be engaged in a port, such as a network adapter port in a computing system and/or a port in a network switch or a hub. Each notification device illuminates to identify the cable and identify the respective port that the cable is engaged with. Accordingly, data center operators may quickly and efficiently locate network components, allowing them to quickly triage failures or administer maintenance operations to the cable or connected components.

Another aspect of the disclosure includes identification of data center components by tracing the identified cable to the target port. For example, if a network interface card is scheduled for replacement or maintenance, the operator can click a button in the device settings tab of the operating system and the cable plugged into a port corresponding to the network adapter can is illuminated. Thus, the system may aide in data center component identification operations where components are difficult to identify, such as in large-scale IT infrastructure arrangements.

Another example embodiment includes identification of a particular server or server rack within a data center. For example, if an administrator is tasked with replacing a particular server in a particular server rack within a data center, the corresponding network cables for all servers in the rack may illuminate in a particular color, such as blue, to help the administrator quickly identify the desired rack. The network cables for a particular server within the rack may illuminate in red in order to differentiate which particular server component is in need of service. Thus, the administrator can quickly locate the component in need of maintenance by locating the rack within the data center and identifying the particular server with reference to the illuminated network cables.

In data centers, it is often painful to determine which network wire is connected with which device port. The teachings of the present disclosure suggest providing an LED in the network connector, such as at the network jack, and enabling the ability to turn the LED on through a variety of interfaces. For example, a user touching the wire may turn the LED on. As another example, a user interface on a machine connected to the wire can illuminate the LED. In certain embodiments, LED's can illuminate the entire wire to enable tracing of the wire. These implementations can also be used to trouble-shoot bad wires.

In one example, an LED is added to the network plug and is powered through the network connector. In most 10/100 MB cables, only 6 wires are used to transmit data, while 2 wires are left available for other purposes. These wires are used to power output devices, such as LED's on both ends of the cable. In more advanced cables, all 4 wire pairs are used for data transmission. However, during LED lighting operations, transmission speeds are reduced in order to accommodate powering the LED.

In certain embodiments, a drop-down menu is provided in the operating system configuration to identify the cable. When this is complete, the LED is powered on and the user views the lit ends on both Ethernet plugs. The menu also allows specification of an amount of time over which the cable should remain illuminated, as well as various additional configuration settings. For example, the LED's may remain lit by default for 120 seconds.

With reference to FIG. 1, a system for data center cable identification is illustrated in accordance with a non-limiting embodiment of the present disclosure. Data center 100 includes server racks 102a-n. Server rack 102a includes servers 110a-n, each connected to network switch 140a by respective cables 150a-n. Switch 140a is connected to network 40 by cable 152a. Exemplary Server 110a includes memory 120, processor 130, and interface 132. Processor 130 loads instructions into memory 120 and executes processes such as driver process 122. Server racks 102b and 102n include a similar configuration.

Driver process 122 operates or controls a particular type of device and provides a software interface to the hardware device. For example, a network interface card has a corresponding driver for installation on the host machine that enables the machine to configure settings and otherwise interact with the network interface card. Driver process 122 may be specific to a hardware device in a server, such as server 110a. For example, driver process 122 may correspond to interface 132. Interface 132 may include a port or jack for receiving network cables such as cable 150a. Driver process 122 can communicate with the device through the computer bus through which the hardware device connects. Driver process 122 can issue commands to any connected devices that the process was designed to operate with, as well as receive input from those devices.

Cable 150a is a physical communication link that includes an identification mechanism, such as an LED, a control module, an activation mechanism, such as a switch, one or more conductors, such as twisted pair cables, and a communication interface terminal, such as a jack, at each terminating end of the communication link. For example, cable 150a may include a category 5 or 5e Ethernet cable with a logic module configured to transmit data and power and provide an identification mechanism with power in response to an instruction from an interface. At least one set of conductors are configured to transmit data, while the other set is configured to pass electrical power. In certain embodiments, the same conductor may be used to transmit both power and data, for example, according to the Institute of Electrical and Electronics Engineers ("IEEE") Alternative A standard. In certain embodiments, at least one set of conductors is used to carry power while another set is used to carry data, for example, according to the IEEE Alternative B standard.

In particular embodiments, the conductors or transmission media include twisted pair cables that include two conductors of a single circuit twisted together. Such a configuration functions to cancel out electromagnetic interference from external sources. For example, certain cables include several twisted pair conductors within a single physical communication link. Other cables may generate electromagnetic radiation, which may degrade or distort signals transmitted on nearby twisted pair conductors. For example, unshielded cables can create distortion. However, shielded cables may additionally produce some distortion due to electromagnetic interference during signal or power propagation. The twisted wires create a balanced pair of carriers that carry equal and opposite signals. Destination devices are designed to determine the difference between the two signals. This form of transmission is referred to as differential mode transmission, since the difference between the two signals carries the output data.

Sources of noise or distortion, such as neighboring transmission lines, cables, or the like, generally affect signals traveling on both wires in the twisted pair equally due to their close physical proximity and general alternating nature. Thus, in differential mode transmission, where only the difference between the two carriers is determined, the output may be unaffected by an equal distortion to both carriers.

Cable 150a can include various other cabling standards without departing from the scope of the present disclosure. For example, cable 150a may include coaxial cable, optical fibre cable, twisted pair cable, Category 5 cable (cat 5), cat 5e, or the like.

Cable 150a connects server 110a to switch 140a. In certain embodiments, cable 150a engages a port at interface 132. Electrical contacts on the face of a jack at one end of cable 150a contact portions of interface 132 port to create an electrical circuit. The circuit created is capable of transmitting both data signals and/or power. In certain embodiments, the jack provides an interface for input and output of power and/or data signals.

Data is transmitted across cable 150a in the form of data packets in a packet switched network. In certain embodiments, interface 132 port is connected to a power source, such as a power source for server 110. The power source may power critical components of server 110 such as capacitor that provides constant power to sensitive internal system components. In one example, the power source may be an internal battery. Interface 132 may connect directly to the power source or may connect to an internal power component, such as the capacitor described above.

Interface 132 transmits power from the power source to cable 150a. In one example, a first set of twisted pair conductors is used to carry power from the power source while a second set of twisted pair conductors carries data packets in a packet switched network. A logic module embedded in cable 150a receives power from the first conductor to create an electrical circuit within the physical communication link. If additional network elements are connected via the cable 150a, the additional elements may also receive power.

Network 40 includes servers 110a-n; 112a-n; and 114a-n, as well as switches 140a-c and any other network components in data center 100. Network 40 is connected to an external network to provide internal network components with access to external devices.

A client device accesses a server administration process via network 40. A user interface or terminal is provided for interacting with the client device. The interface allows an administrator to manage operations of the data center 100. For example, in a virtual cloud environment, virtual machine management systems configure physical server components and provide users with the ability to scale and provision systems. The server administration process manages settings for physical servers in the data center. Certain administration processes have resource management functionality that enable administrators to manage application deployment and physical and virtual resource consumption while planning for future capacity issues. For example, an administrator can reconfigure server settings for servers that are hosting a particular critical business application.

Server settings can include network adapter and networking device configurations. For example, a device driver may provide an interface for such a system to manage server network configuration settings. Driver 122 may enable such an interface. For example, the server administration process can call driver 122 to issue commands to physical network components. Details regarding the interface components will be discussed further with reference to FIGS. 4-5 below.

Figure 2:
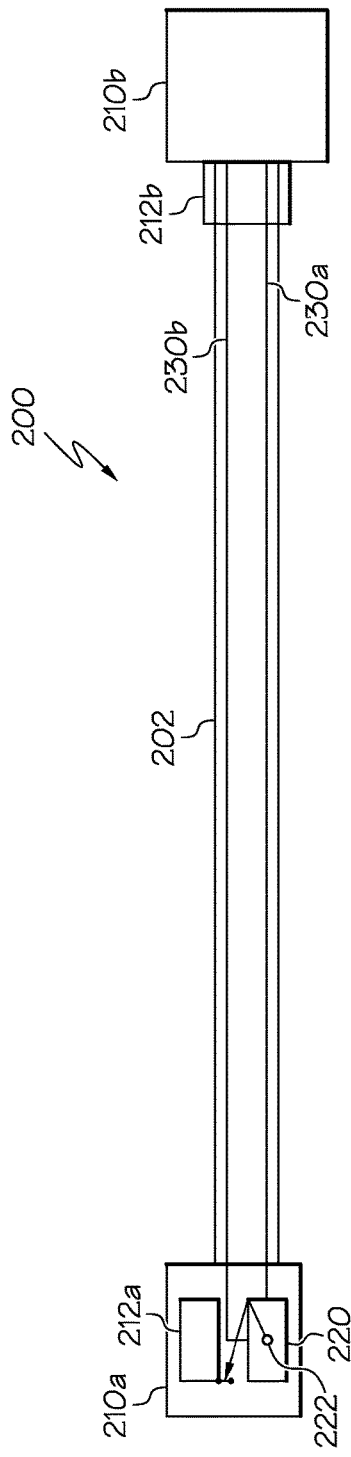
FIG. 2 illustrates a block diagram of physical communication link in a system for data center cable identification in accordance with a particular non-limiting embodiment of the present disclosure.

With reference to FIG. 2, a physical communication link 200 is illustrated in accordance with a non-limiting embodiment of the present disclosure. The physical communication link includes two conductors 230*a-b*, identification devices 212*a-b*, jacks or interfaces 210*a-b*, and logic module 220. In certain embodiments, data packets are carried via conductor 230*a*, while power is carried via conductor 230*b*. Power is supplied to logic module 220 to create a circuit within the physical communication link 200. Logic module 220 also receives data packets. For example, the logic module may be addressable on the network created when interfaces 210*a-b* are connected to a network. In other words, a router may assign logic module 220 an IP address and data may be sent from and received by the logic module.

In certain embodiments, logic module receives instructions directly from software running on a connected device, such as a device driver configured to interact with the logic module.

Logic module 220 controls a switch 222 that connects identification device 212*a* to the electrical circuit to provide it with power. In certain embodiments, the implementation of supplying power to the identification device may vary from this specific implementation. For example, the logic module can control the brightness or color of the identification device. In certain embodiments, the identification device may be a miniature screen, or any other output device, such as a device configured to emit a noise or some other signal. The logic module may be capable of controlling all aspects of the output emitted from identification devices 212*a* and/or 212*b*. In certain embodiments, the logic module can control the identification devices to emit different colors depending on the type of device the jacks 210*a-b* are engaged with.

In one embodiment, the logic module receives an instruction from a network component. The instruction specifies the color of the light to produce in the identification device, a pattern for the identification device to emit, a message for the identification device to display, and/or the like. The instruction can also specify a timer period for the identification device to be turned on during. For example, the identification device may be illuminated for a period of 1 minute to allow an administrator to identify the communication link.

In certain embodiments, it may be necessary for the conductors to throttle down or stop data transmission during identification processes. For example, certain Ethernet devices may use all available conductors to transfer data at the fastest rates possible. In these devices, no conductors remain to carry power to the identification devices. In these situations, the logic module or device driver can throttle throughput or stop transmission of data over at least one conductor. That conductor is now free to carry power to the identification device. Thus, during a critical system failure, network throughput can be sacrificed for brief periods of time in order to enable cable and device identification procedures for solving critical system issues. In certain embodiments, power can be supplied in alternating patterns, such as a flicker. Thus, data can be transmitted over the conductor during the periods when power is not being carried over the conductors in an alternating power in order to minimize the disruption associated with identification procedures.

Identification devices may be located at virtually any location on or connected to the physical communication link 200. For example, identification devices may be located at each jack or along the cable itself. As another example, numerous output devices can be located along the cable for identification.

Identification may take the form of virtually any output device. As discussed above, the identification device may be a simple LED light, a complex display, an audio output device, or any other output device.

Figure 3:
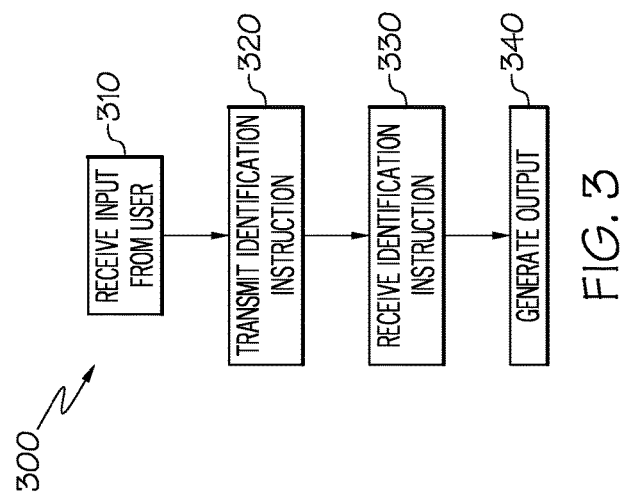
FIG. 3 illustrates a flow chart of a method for data center cable identification in accordance with a particular non-limiting embodiment of the present disclosure.

With reference to FIG. 3, a method 300 for data center cable identification is illustrated in accordance with a non-limiting embodiment of the present disclosure. At step 310, an input from a user is received. For example, a user input is received at an interface of a device in a network.

The user interface may transmit an identification instruction to a logic module on a cable at step 320. For example, the identification instruction can be an IP packet transmitted through a router to a connected cable. As another example, a device driver in a connected component interacts with the cable through an interface component and transmits a command to the cable. The logic module receives the identification instruction at step 330. In response to receiving the identification instruction, the identification device generates an output according to the received instruction. For example, the module includes an integrated circuit that processes the instruction and operates the identification device to generate the output.

Figure 4:
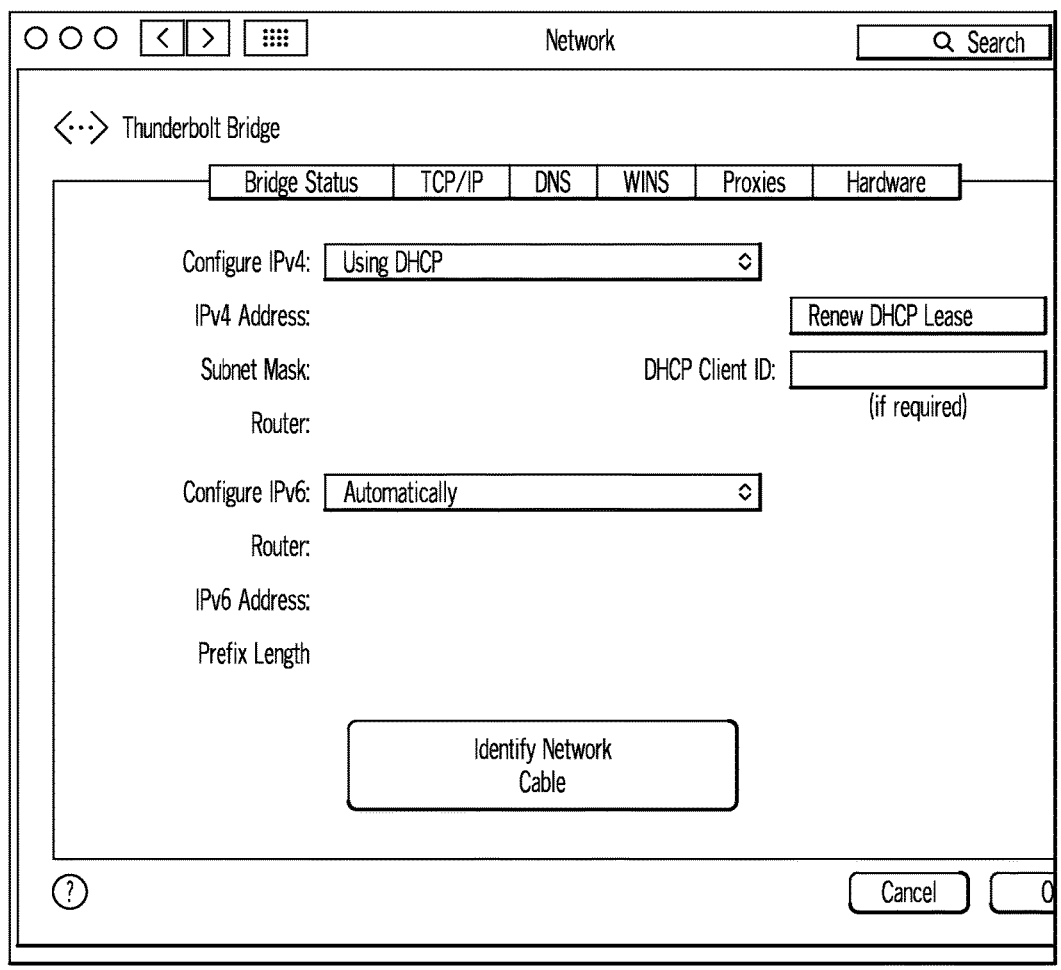
FIG. 4 illustrates a screen shot of an interface for data center cable identification in accordance with a particular non-limiting embodiment of the present disclosure.

With reference to FIG. 4, an example interface for use in a system for data center cable identification is illustrated. The interface is presented in accordance with a network settings interface implemented by an operating system for displaying device management settings. The device settings may include various network configuration provided by a device driver, such as the device driver for a network adapter.

The interface may have an "Identify Network Cable" button. A user presses the button and an instruction is sent to the network cable to generate an output at an identification module. In certain embodiments further identification may be displayed at such an interface, such as the timing of the identification, the type, the color, the flash pattern, or any other output settings.

Figure 5:
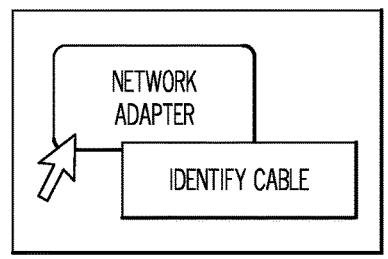
FIG. 5 illustrates a context menu interface in a system for data center cable identification in accordance with a particular non-limiting embodiment of the present disclosure.

The interface may additionally or alternatively be displayed, for example, in the form of a context menu as displayed in FIG. 5. For example, a user can right click on an icon for a network adapter or cable in a Network Devices menu. A context menu is displayed and the user selects "Identify Cable." The interface sends an instruction to the logic module on the cable to generate an output at the designated cable.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A communication link, comprising:
    a first conductor configured to transmit data between a plurality of connected network devices;
    a light emitting device configured to transmit an output that identifies the communication link when power is supplied to it;
    a second conductor configured to complete an electrical circuit when it receives the power from a particular device in the plurality of connected network devices, wherein the light emitting device is coupled with the electrical circuit by a switch;
    an integrated circuit, addressable by an internet protocol ("IP") address on the network, configured to:
        receive an identification instruction addressed to the IP address of the integrated circuit, wherein the identification instruction is transmitted between the plurality of connected network devices along the first conductor for an identification instruction; and
        in response to receiving the identification instruction, actuate the switch to supply the light emitting device with power and transmit the output at the light emitting device.

2. The communication link of claim 1, wherein the light emitting device comprises:
    a first light disposed at a first plug of the communication link, the first plug engaged with a jack of a first device in the plurality of connected network devices; and
    a second light disposed at a second plug of the communication link, the second plug engaged with a jack of a second device in the plurality of connected network devices.

3. The communication link of claim 1, wherein the integrated circuit is addressable in a network created by the plurality of connected network devices, and wherein the identification instruction is an internet protocol packet addressed to the integrated circuit and sent from a first device in the plurality of connected network devices.

4. The communication link of claim 1, wherein the identification instruction is received from an interface of a first network device in the plurality of connected network devices.

5. The communication link of claim 1, wherein the identification instruction is a command issued from a device driver executing on a first device in the plurality of connected network devices.

6. The communication link of claim 1, wherein the first conductor and the second conductor comprise a single wire for receiving power and transmitting data.

7. The communication link of claim 1, wherein the light emitting device is a light emitting diode, and wherein the integrated circuit is further configured to operate the switch to illuminate the light emitting diode for a predetermined period of time in response to receiving the identification instruction.

8. The communication link of claim 1, wherein the first conductor and the second conductor are twisted pair cables.

9. The communication link of claim 1, wherein the first conductor and the second conductor are fiber optic links.

10. The communication link of claim 1, wherein the light emitting device is a display, and wherein the output is a message.

11. A method comprising:
    receiving an identification instruction at an integrated circuit in a communication link, wherein the integrated circuit is addressable by an internet protocol ("IP") address on a network, wherein the identification instruction is addressed to the IP address of the integrated circuit, and wherein the communication link comprises:
        a first conductor configured to transmit data between a plurality of connected network devices;
        a light emitting device configured to transmit an output that identifies the communication link when power is supplied to it; and
        a second conductor configured to complete an electrical circuit when it receives the power from a particular device in the plurality of connected network devices, wherein the light emitting device is coupled with the electrical circuit by a switch; and
    in response to receiving the identification instruction, operating the switch to supply the light emitting device with power and transmit the output at the light emitting device.

12. The method of claim 11, wherein the light emitting device comprises:
    a first light disposed at a first plug of the communication link, the first plug engaged with a jack of a first device in the plurality of connected network devices; and
    a second light disposed at a second plug of the communication link, the second plug engaged with a jack of a second device in the plurality of connected network devices.

13. The method of claim 11, wherein the integrated circuit is addressable in a network created by the plurality of connected network devices, and wherein the identification instruction is an internet protocol packet addressed to the integrated circuit.

14. The method of claim 11, wherein the identification instruction is received from an interface of a first device in the plurality of connected network devices.

15. The method of claim 11, wherein the identification instruction is a command issued from a driver process, the driver process executing on a first device in the plurality of connected network devices.

16. The method of claim 11, wherein the first conductor and the second conductor comprise a single wire for receiving power and transmitting data.

17. The method of claim 11, wherein the light emitting device is a light emitting diode, and wherein the integrated circuit is further configured to illuminate the light emitting diode for a predetermined period of time in response to receiving the identification instruction.

18. The method of claim 11, wherein the first conductor and the second conductor are twisted pair cables.

19. The method of claim 11, wherein the light emitting device is a display, and wherein the output is a message.

20. A computer program product comprising:
   a non-transitory computer-readable storage medium having computer-readable program code embodied therewith, the computer-readable program code configured to:
      receive an identification instruction at an integrated circuit in a communication link, wherein the integrated circuit is addressable by an internet protocol ("IP") address on a network, wherein the identification instruction is addressed to the IP address of the integrated circuit, and wherein the communication link comprises:
         a first conductor configured to transmit data between a plurality of connected network devices;
         a light emitting device configured to transmit an output that identifies the communication link when power is supplied to it; and
         a second conductor configured to complete an electrical circuit when it receives the power from a particular device in the plurality of connected network devices, wherein the light emitting device is coupled with the electrical circuit by a switch; and
      in response to receiving the identification instruction, actuate the switch to supply the light emitting device with power and transmit the output at the light emitting device.

* * * * *